(12) United States Patent
Davis

(10) Patent No.: US 8,799,327 B2
(45) Date of Patent: Aug. 5, 2014

(54) SYSTEM, METHOD AND COMPUTER PROGRAM PRODUCT FOR DERIVING COMMONALITIES AMONG DATA ENTRIES

(75) Inventor: Mark Neil Davis, Foster City, CA (US)

(73) Assignee: salesforce.com, inc., San Francisco, CA (US)

( * ) Notice: Subject to any disclaimer, the term of this patent is extended or adjusted under 35 U.S.C. 154(b) by 53 days.

(21) Appl. No.: 12/958,314

(22) Filed: Dec. 1, 2010

(65) Prior Publication Data

US 2011/0246544 A1 Oct. 6, 2011

Related U.S. Application Data

(60) Provisional application No. 61/320,185, filed on Apr. 1, 2010.

(51) Int. Cl.
*G06F 17/30* (2006.01)
*G06Q 40/04* (2012.01)

(52) U.S. Cl.
CPC ............................... *G06F 17/30702* (2013.01)
USPC ............................................ 707/802; 705/37

(58) Field of Classification Search
None
See application file for complete search history.

(56) References Cited

U.S. PATENT DOCUMENTS

| | | | |
|---|---|---|---|
| 5,577,188 A | 11/1996 | Zhu et al. | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,894,311 A * | 4/1999 | Jackson | 345/440 |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |

(Continued)

OTHER PUBLICATIONS

U.S. Appl. No. 60/828,192, filed Oct. 4, 2006.

*Primary Examiner* — Tarek Chbouki
(74) *Attorney, Agent, or Firm* — Zilka-Kotab, PC

(57) ABSTRACT

In accordance with embodiments, there are provided mechanisms and methods for deriving commonalities among data entries. These mechanisms and methods for deriving commonalities among data entries can identify characteristics that are known to be common to at least some data entries in addition to unknown characteristics that are common to data entries. The ability to identify common known and unknown characteristics among data entries may allow data entries to be grouped according to the identified common known and unknown characteristics.

16 Claims, 5 Drawing Sheets

(56) References Cited

U.S. PATENT DOCUMENTS

| | | |
|---|---|---|
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner |
| 6,850,895 B2 | 2/2005 | Brodersen et al. |
| 6,850,949 B2 | 2/2005 | Warner et al. |
| 7,062,502 B1 | 6/2006 | Kesler |
| 7,181,758 B1 | 2/2007 | Chan |
| 7,209,929 B2 | 4/2007 | Dominguez, Jr. et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,542,969 B1 * | 6/2009 | Rappaport et al. .................... 1/1 |
| 7,620,655 B2 | 11/2009 | Larsson et al. |
| 7,698,160 B2 | 4/2010 | Beaven et al. |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,457,545 B2 | 6/2013 | Chan |
| 8,484,111 B2 | 7/2013 | Frankland et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0078913 A1 * | 4/2003 | McGreevy ........................ 707/3 |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0204484 A1 * | 10/2003 | Charpiot et al. ................... 707/1 |
| 2003/0206192 A1 | 11/2003 | Chen et al. |
| 2003/0225730 A1 | 12/2003 | Warner et al. |
| 2003/0233404 A1 | 12/2003 | Hopkins |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0093557 A1 * | 5/2004 | Kawatani ....................... 715/500 |
| 2004/0111386 A1 * | 6/2004 | Goldberg et al. .................. 707/1 |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0154615 A1 * | 7/2005 | Rotter et al. ....................... 705/3 |
| 2005/0223022 A1 | 10/2005 | Weissman et al. |
| 2005/0283478 A1 | 12/2005 | Choi et al. |
| 2006/0062363 A1 * | 3/2006 | Albrett ..................... 379/101.01 |
| 2006/0206834 A1 | 9/2006 | Fisher et al. |
| 2007/0136221 A1 * | 6/2007 | Sweeney et al. ................. 706/20 |
| 2008/0249972 A1 | 10/2008 | Dillon |
| 2009/0063415 A1 | 3/2009 | Chatfield et al. |
| 2009/0313299 A1 * | 12/2009 | Bonev et al. ............. 707/103 R |
| 2011/0029467 A1 * | 2/2011 | Spehr et al. ..................... 706/13 |

* cited by examiner

SYSTEM, METHOD AND COMPUTER PROGRAM PRODUCT FOR DERIVING COMMONALITIES AMONG DATA ENTRIES

CLAIM OF PRIORITY

This application claims the benefit of U.S. Provisional Patent Application 61/320,185 entitled "Method And System For Applying Algorithmic Similarity Logic Across Heuristic CRM Data And A Broad Database Of Potential Customers in Order To Source Likely Matches," by Mark Neil Davis, filed Apr. 1, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to data groupings in a data set.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional data sets, data entries within a data set oftentimes have similar characteristics. For example, records in a database may have the same values for a particular field. In the past, these similarities have been utilized to group the data entries, such that a particular group includes data entries with at least one similar characteristic.

Unfortunately, techniques in which the similarities among data entries are derived have been limited. Just by way of example, these techniques typically have only been used to group the data entries according to a single layer of commonality, such as a single common characteristic, thus failing to identify associations between various similarities. Accordingly, it is desirable to provide techniques enabling data entries in a data set to be grouped according to a particular common characteristic, where further common characteristics among that group are determined, thus identifying characteristics associated with the particular characteristic.

BRIEF SUMMARY

In accordance with embodiments, there are provided mechanisms and methods for deriving commonalities among data entries. These mechanisms and methods for deriving commonalities among data entries can enable embodiments to identify multiple commonalities among data entries. The ability of embodiments to identify multiple commonalities among data entries may allow associations between characteristics to be identified.

In an embodiment and by way of example, a method for deriving commonalities among data entries is provided. In use, a set of data including a plurality of data entries having a common predefined first aspect is identified. Further, at least one common second aspect is derived from the data entries, utilizing a similarity algorithm.

While one or more implementations and techniques are described with reference to an embodiment in which deriving commonalities among data entries is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e. ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for deriving commonalities among data entries,

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing deriving commonalities among data entries will be described with reference to example embodiments.

Figure 1:
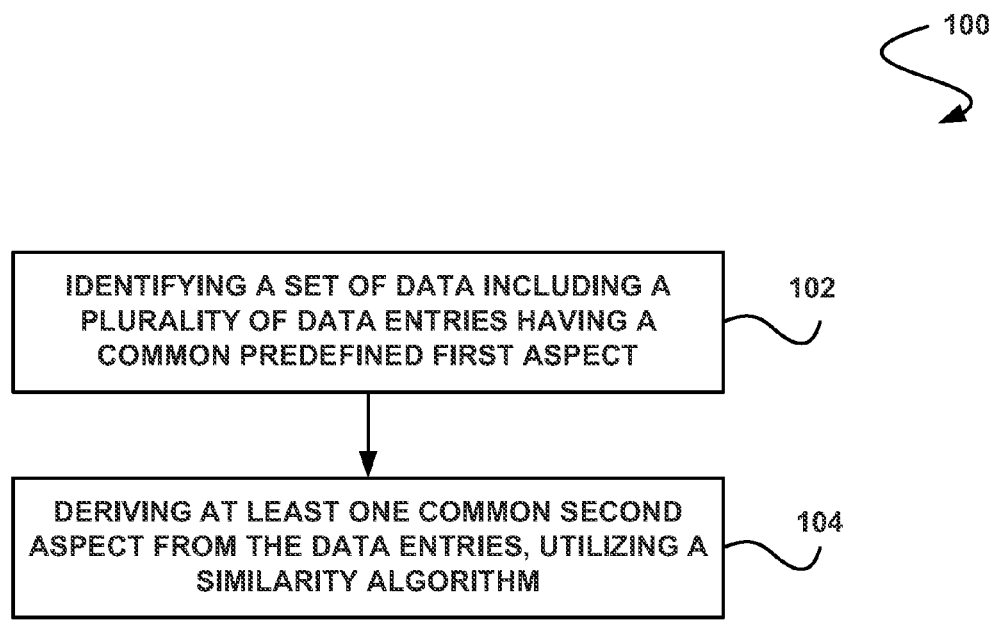
FIG. 1 illustrates a method for deriving commonalities among data entries, in accordance with an embodiment.

FIG. 1 illustrates a method 100 for deriving commonalities among data entries, in accordance with an embodiment. As shown in operation 102, a set of data including a plurality of data entries having a common predefined first aspect is identified. Each data entry may include a database record, a log entry, or any other entry in the set of data. To this end, the set of data may include a database, a log file, or any other type of collection of the data entries.

In one embodiment, the set of data may be specific to an entity. For example, the set of data may be gathered by the entity. Such entity may include a company, organization, tenant of a multi-tenant on-demand database system, the multi-tenant on-demand database system, etc. Just by way of example, the set of data may include historical data describing activities of the entity.

As noted above, each of the data entries has the common predefined first aspect. In the context of the present description, the common predefined first aspect includes any predefined aspect (e.g. characteristic, value, etc.) that is common amongst the data entries. For example, the common predefined first aspect may be a particular value included in each of the data entries.

In one embodiment, the set of data may be identified utilizing the common predefined first aspect. For example, the common predefined first aspect may be identified as a first aspect that has been predefined (e.g. by a user, etc.), and then utilized (e.g. as a filter, etc.) to identify the data entries having such first aspect, and thus common amongst the data entries, from another larger set of data. Thus, the set of data may be identified by determining from the larger set of data the data entries each having the common predefined first aspect.

Such larger set of data may include a larger set of data entries (i.e. than the set of data including the plurality of data entries described above). In this way, the larger set of data entries may include some which have the first aspect of some which may not necessarily have the first aspect. It should be noted that such larger set of data may also be specific to the entity.

Further, as shown in operation 104, at least one common second aspect is derived from the data entries, utilizing a similarity algorithm. In the context of the present description, the common second aspect includes any predefined aspect that is common amongst the data entries. Of course, it should be noted that the common second aspect is an aspect that is different from the common predefined first aspect.

In one embodiment, the common second aspect may be a particular value included in multiple of the data entries. In another embodiment, the common second aspect may be a particular value included in at least a threshold number of the data entries. In yet another embodiment, the common second aspect may be a particular value included in an of the data entries.

Optionally, the common second aspect may be derived utilizing the similarity algorithm by determining that the common second aspect is included in multiple of a threshold number of, all of, etc. the data entries. It should be noted that the similarity algorithm may include any algorithm capable of computationally analyzing the data entries to determine aspects that are common amongst the data entries. For example, the similarity algorithm may include a cluster analysis algorithm.

To this end, by deriving the common second aspect from the data entries having the common predefined first aspect, aspects common amongst data entries having another predefined aspect may be identified. Optionally, the common second aspect may be identified as an aspect associated with the common predefined first aspect. For example, such association may be utilized as an indication that when the common second aspect is included in a data entry, the data entry is likely associated with the common predefined first aspect, as described in more detail below with reference to the subsequent figures.

Figure 2:
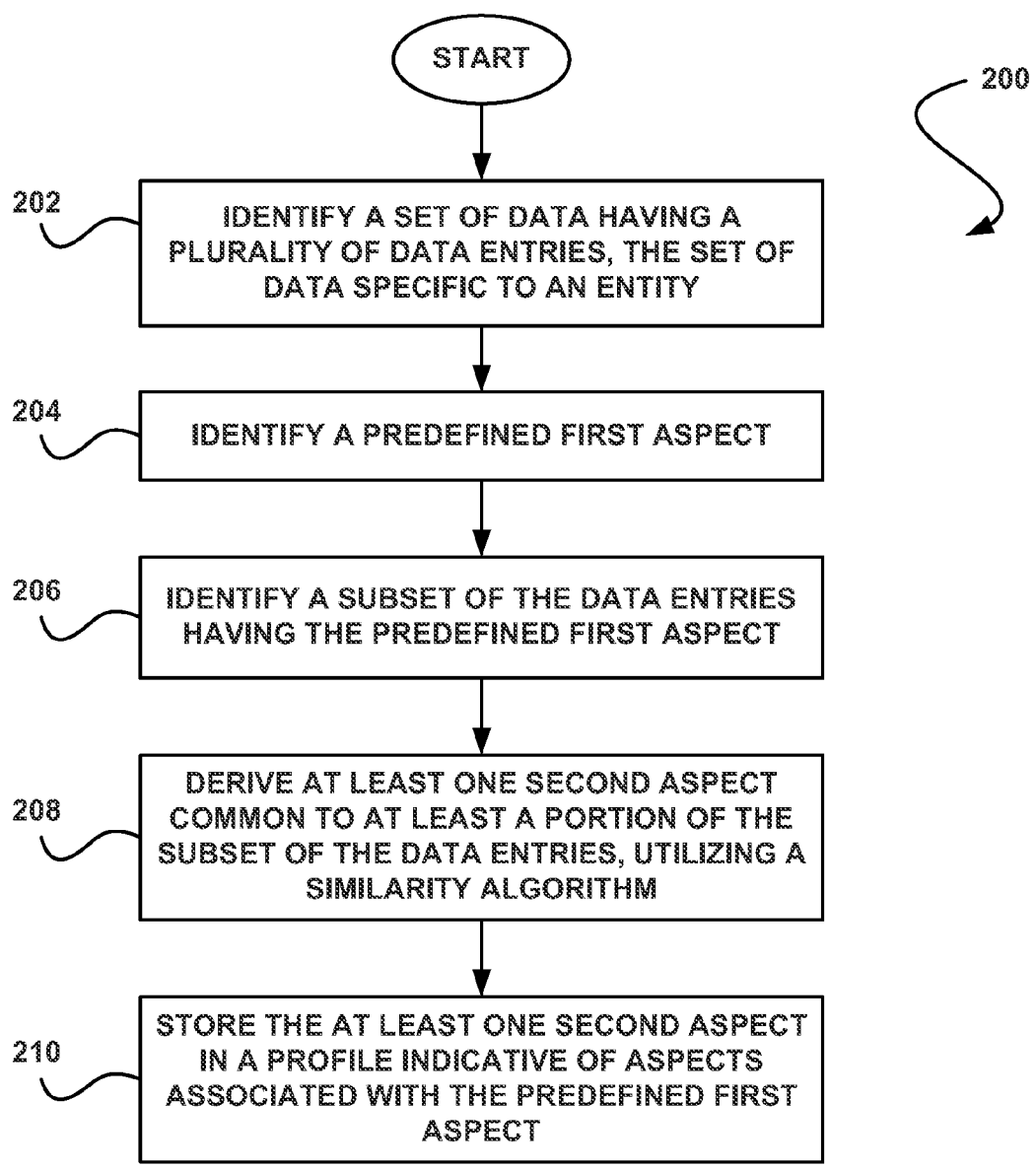
FIG. 2 illustrates a method for generating a profile indicative of aspects associated with a predefined aspect, in accordance with an embodiment.

FIG. 2 illustrates a method 200 for generating a profile indicative of aspects associated with a predefined aspect, in accordance with an embodiment. As an option, the method 200 may be carried out in the context of the architecture and environment of FIG. 1. Of course, however, the method 200 may be carried out in any desired environment.

As shown in operation 202, a set of data having a plurality of data entries is identified, where the set of data is specific to an entity. In one embodiment, the set of data may include a database and the data entries may be records populated by the entity. In another embodiment, the data entries may each indicate activity associated with the entity, such that the set of data is a history of activities associated with the entity.

Additionally, as shown in operation 204, a predefined first aspect is identified. With respect to the present embodiment, the predefined first aspect includes any value capable of being included in at least one of the data entries. For example, where the data entries include records, the predefined first aspect may include a value capable of being included in a field of at least one of the records.

Further, as shown in operation 206, a subset of the data entries having the predefined first aspect is identified. In one embodiment, the data entries may be filtered utilizing the predefined first aspect, such that the filtered our data entries are identified as those having the predefined first aspect. In another embodiment, the data entries may be analyzed for identifying those having the predefined first aspect.

Still yet, as shown in operation 208, at least one second aspect common to at least a portion of the subset of the data entries is derived, utilizing a similarity algorithm. For example, a second aspect included in two or more of the data entries included in the subset identified in operation 206 may be derived. As another example, a second aspect included in a threshold number (e.g. majority, etc.) of the data entries included in the subset identified in operation 206 may be derived.

As an option, a query may be executed against the subset of the data entries to identify a ranked set of matches across user selected criteria (i.e. the largest sales that took less than a configured number of weeks to close). The results of the query may be analyzed to show the common aspects of the data entries in the subset across the various aspect dimensions stored in each of the data entries, weighted by the dimension of highest similarity. As a further option, the top weighted aspect dimensions of similarity may be derived as the second aspect described above.

As shown in operation 210, the at least one second aspect is stored in a profile indicative of aspects associated with the predefined first aspect. The profile may include a data structure (e.g. file, record, etc.) capable of storing any second aspect identified as being common to data entries having the predefined first aspect. In one embodiment, the profile may be specific to the predefined first aspect, such that the second aspect(s) stored in the profile are known as being associated with the predefined first aspect.

Figure 3:
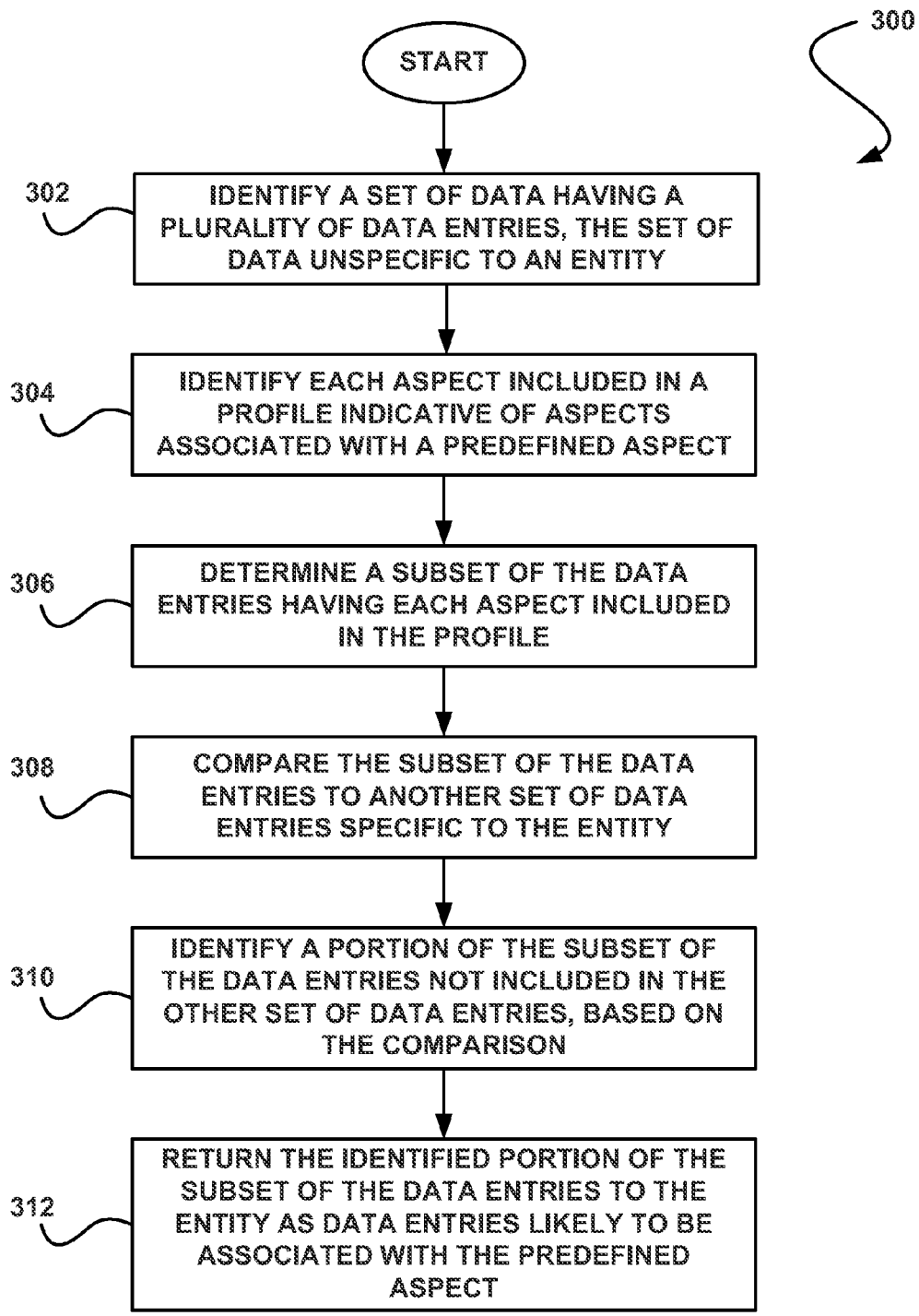
FIG. 3 illustrates a method for utilizing aspects included in a profile to identify data entries likely to be associated with a particular predefined aspect, in accordance with an embodiment.

FIG. 3 illustrates a method 300 for utilizing aspects included in a profile to identify data entries likely to be associated with a particular predefined aspect, in accordance with an embodiment. As an option, the method 300 may be carried out in the context of the architecture and environment of FIGS. 1-2. For example, the method 300 may be carried out subsequent to the method 200 of FIG. 2. Of course, however, the method 300 may be carried out in any desired environment.

As shown in operation 302, a set of data having a plurality of data entries is identified, where the set of data is unspecific to an entity. For example, the set of data may be associated with multiple entities. In one embodiment, each of the data entries may be associated with a different entity.

In the context of the method 200 of FIG. 2, the set of data identified in operation 202 may include a first set of data having a first set of data entries, and the set of data identified in operation 302 may include a second set of data having a second set of data entries. Thus, the second set of data may be different from the first set of data. As an option, the second set of data may be larger than the first set of data (e.g. may have entries not necessarily included in the first set of data). As another option, the first set of data may be gathered by a first entity, and the second set of data may be gathered by a second entity, such that the first set of data entries are at least partially different from the second set of data entries.

Further, as shown in operation 304, each aspect included in a profile indicative of aspects associated with a predefined aspect are identified. For example, a predefined aspect may be identified, and a profile associated therewith may be further identified, where such profile stores aspects associated with the predefined aspect (e.g. as described above with respect to the method 200 of FIG. 2). To this end, aspects included in such profile may be identified (e.g. parsed from the profile, etc.).

In addition, a subset of the data entries (i.e. the second set of data entries described above) having each aspect included in the profile is determined. Note operation 306. In one embodiment, it may be determined whether each data entry included in the set of data has all aspects included in the profile. In response to a determination that a data entry has all of such aspects, the data entry may be included in the subset.

As noted above, the profile may store aspects associated with the predefined aspect. Accordingly, the subset of the data entries may be identified as being likely to be associated with the predefined aspect, based on the determination that each of the data entries in the subset has the aspects included in the profile. For example, where the data entries in the subset do not necessarily have the predefined aspect, such data entries may be identified as likely to be (e.g. or more likely than not to be) associated with the predefined aspect.

Moreover, the subset of the data entries is compared to another set of data entries specific to the entity, as shown in operation 308. For example, the other set of data entries may include the first set of data entries described above. In one embodiment, the comparison may include determining whether each data entry in the subset (or an aspect of each data entry in the subset) is included in the other set of data entries specific to the entity.

Still yet, as shown in operation 310, a portion of the subset of the data entries not included in the other set of data entries is identified, based on the comparison. Thus, from the subset of the data entries, data entries (or the aspect thereof mentioned above) not included in the other set of data entries may be determined.

Furthermore, the identified portion of the subset of the data entries is returned to the entity as data entries likely to be associated with the predefined aspect. Note operation 312. In one embodiment, returning the identified portion of the subset of the data entries may include displaying the identified portion of the subset of the data entries. For example, the method 300 may be performed by the entity such that the entity may identify new data entries likely to be associated with the predefined aspect.

In one exemplary embodiment, the methods 200 and 300 of FIGS. 2-3 may be utilized to apply a similarity algorithm across heuristic customer relationship management (CRM) data and a broad database of potential customers in order to source likely matches. For example, a body of existing historical sales data can be computationally analyzed utilizing a similarity algorithm to identify the similarities between successful deals (e.g. where success may be defined as a sale that closed). The resulting similarities can then be applied against a large set of untapped sales targets to identify an optimized list of leads. This list may be optimized down to prospects that the historical data indicates are highly likely for success based on the sales approach used in the past.

For example, over time, a company that utilizes an existing automated CRM solution may build up a large set of heuristic data that covers interactions with their prospects. This may include data regarding the results of the contact (e.g. sale, size of deal, etc.), information about the prospect (e.g. line of business, company size, location, annual revenue, demographic information, etc.) and sales approaches. The dataset can be mined for successful sales (e.g. the predefined aspect) to identify commonalities and trends in types of contacts and tactics (e.g. other aspects) that lead to the successful sales.

Once the variables that describe the historically successful sales prospects are identified, those variables may be applied to a larger set of potential prospects (e.g. Yellow Pages of all available businesses) in order to select from that net the prospects having those variables, and thus those with the highest historical likeliness for a successful sale. By matching on aspects such as line of business, location, company size, revenue, etc., it may be possible to derive a match of untapped customers that are an optimal fit for the product and sales approaches used by the CRM entity.

System Overview

Figure 4:
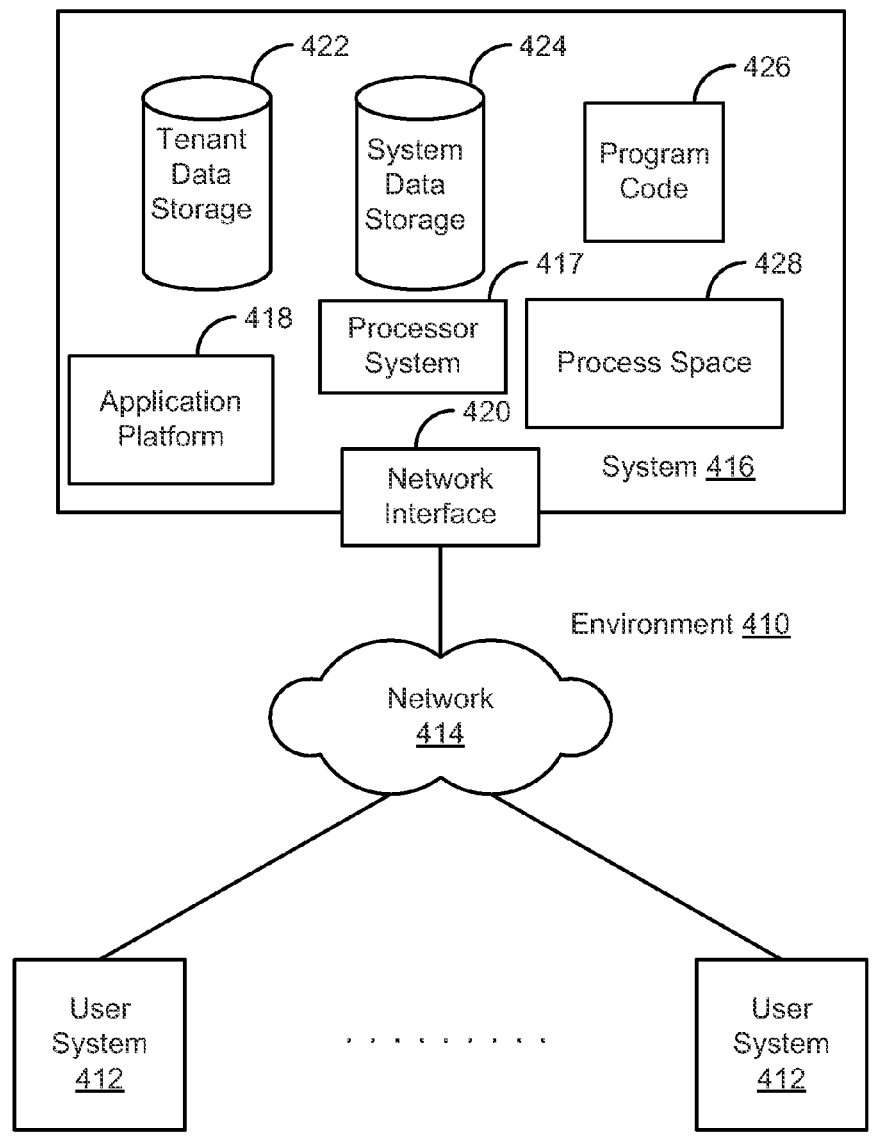
FIG. 4 illustrates a block diagram of an example of an environment wherein an on-demand database service might be used.

FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein, A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAR-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, hut the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory IC's), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
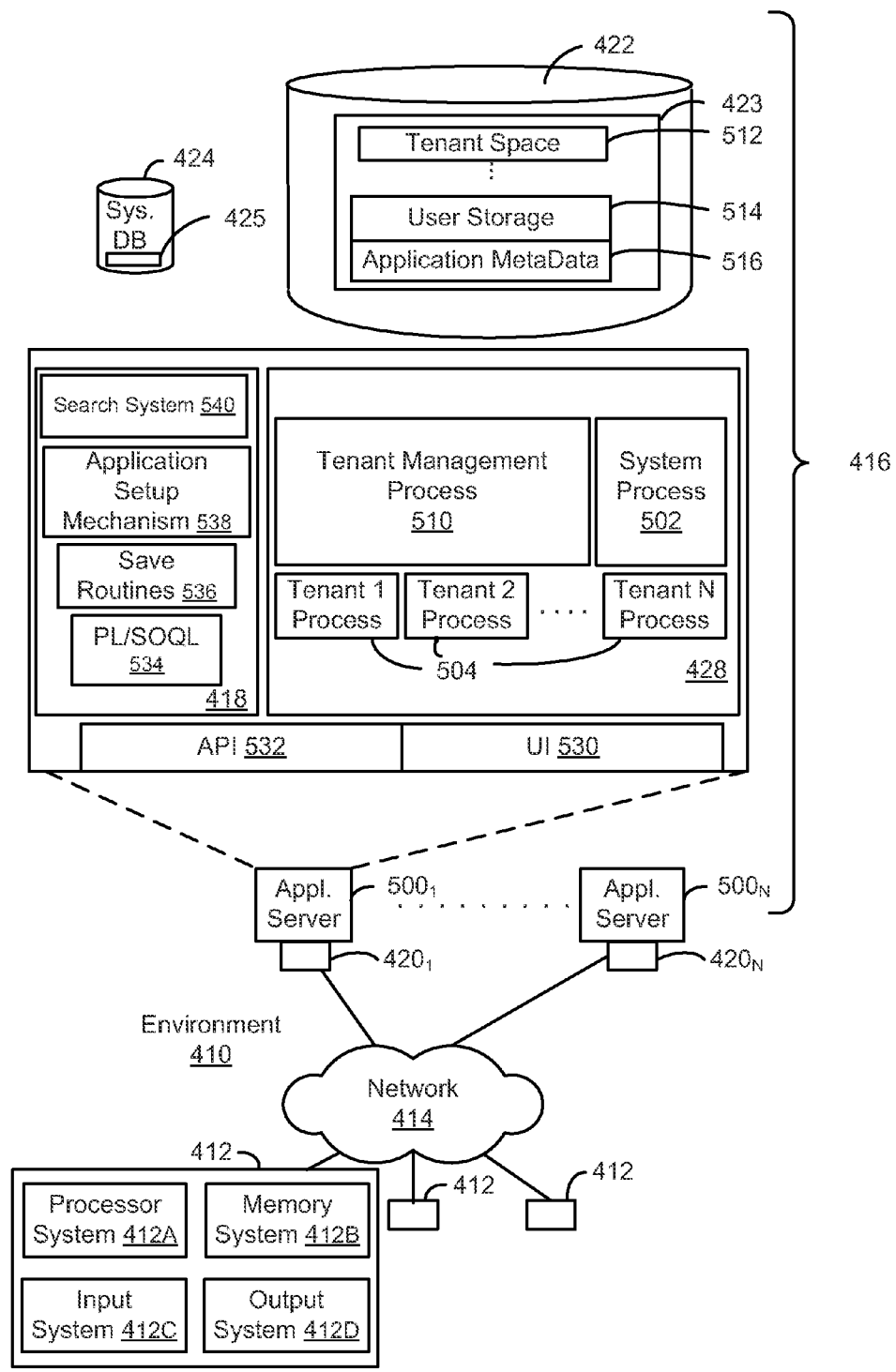
FIG. 5 illustrates a block diagram of an embodiment of elements of FIG. 4 and various possible interconnections between these elements.

FIG. 5 also illustrates environment 410. However, in FIG. 5 elements of system 416 and various interconnections in an embodiment are further illustrated. FIG. 5 shows that user system 412 may include processor system 412A, memory system 41213, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

in some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product comprising a non-transitory computer readable storage medium storing therein executable instructions configured to implement a method, the method comprising:
   identifying from historical data detailing a plurality of customer interactions a plurality of successful sales, where each successful sale includes historical data indicating one or more customer interactions that resulted in the successful sale;
   for each successful sale, deriving customer tactical information associated with the one or more customer interactions for the successful sale;
   determining a count of a set of the successful sales that share common customer tactical information;
   comparing the determined count to a predefined threshold number; and
   when it is determined from the comparison that the determined count meets or exceeds the predefined threshold number, storing the common customer tactical information in a profile specific to the set of successful sales.

2. The computer program product of claim 1, wherein the set of successful sales is specific to an entity.

3. The computer program product of claim 1, wherein the set of successful sales each include a record in a database.

4. The computer program product of claim 1, further comprising computer code for identifying a database of businesses and individuals.

5. The computer program product of claim 4, wherein the computer program product is operable such that the set of successful sales is gathered by a first entity, and the database of businesses and individuals is gathered by a second entity.

6. The computer program product of claim 4, further comprising computer code for determining a subset of the database of businesses and individuals having the common customer tactical information.

7. The computer program product of claim 6, wherein the computer program product is operable such that the subset of the database of businesses and individuals are identified as being likely to be associated with the set of successful sales, based on the determination that the subset of the second set of data entries have the common customer tactical information.

8. The computer program product of claim 6, further comprising computer code for returning the determined subset of the database of businesses and individuals.

9. The computer program product of claim 8, wherein returning the determined subset of the database of businesses and individuals includes displaying the determined subset of the database of businesses and individuals.

10. The computer program product of claim 6, further comprising identifying and returning contact information associated with the subset of the database of businesses and individuals having the common customer tactical information.

11. The computer program product of claim 1, wherein each of the successful sales in the set includes a record, and the historical data indicating a successful sale is included in a field of each of the records.

12. The computer program product of claim 1, wherein information stored in the profile is considered known as being associated with the set of successful sales.

13. The computer program product of claim 1, wherein the common customer tactical information includes a common line of business, a common location, a common company size, and a common revenue.

14. A method, comprising:
   identifying from historical data detailing a plurality of customer interactions a plurality of successful sales, where each successful sale includes historical data indicating one or more customer interactions that resulted in the successful sale;
   for each successful sale, deriving customer tactical information associated with the one or more customer interactions for the successful sale;
   determining a count of a set of the successful sales that share common customer tactical information;
   comparing the determined count to a predefined threshold number; and
   when it is determined from the comparison that the determined count meets or exceeds the predefined threshold number, storing the common customer tactical information in a profile specific to the set of successful sales.

15. A system, comprising:
   a processor for:
      identifying from historical data detailing a plurality of customer interactions a plurality of successful sales, where each successful sale includes historical data indicating one or more customer interactions that resulted in the successful sale;
      for each successful sale, deriving customer tactical information associated with the one or more customer interactions for the successful sale;
      determining a count of a set of the successful sales that share common customer tactical information;
      comparing the determined count to a predefined threshold number; and
      when it is determined from the comparison that the determined count meets or exceeds the predefined threshold number, storing the common customer tactical information in a profile specific to the set of successful sales.

16. A method for transmitting code, comprising:
   transmitting code to identify from historical data detailing a plurality of customer interactions a plurality of successful sales, where each successful sale includes historical data indicating one or more customer interactions that resulted in the successful sale;
   transmitting code to derive, for each successful sale, customer tactical information associated with the one or more customer interactions for the successful sale, using a processor;
   transmitting code to determine a count of a set of the successful sales that share common customer tactical information;
   transmitting code to compare the determined count to a predefined threshold number; and
   when it is determined from the comparison that the determined count meets or exceeds the predefined threshold number, transmitting code to store the common customer tactical information in a profile specific to the set of successful sales.

* * * * *